US012589862B2

(12) United States Patent (10) Patent No.: US 12,589,862 B2
Talapureddi et al. (45) Date of Patent: Mar. 31, 2026

(54) METHOD AND SYSTEM OF AUTOMATIC WARNINGS AND GUIDANCE FOR AVOIDING LOSS OF TAIL ROTOR EFFECTIVENESS ON A ROTORCRAFT

(71) Applicant: HONEYWELL INTERNATIONAL INC., Charlotte, NC (US)

(72) Inventors: Murali Mohan Talapureddi, Peoria, AZ (US); Michael Popescu, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/800,713

(22) Filed: Aug. 12, 2024

(65) Prior Publication Data

US 2025/0361004 A1 Nov. 27, 2025

(30) Foreign Application Priority Data

May 24, 2024 (IN) ............................. 202411040522

(51) Int. Cl.
| *B64C 27/00* | (2006.01) |
| *B64C 27/06* | (2006.01) |
| *B64D 45/00* | (2006.01) |
| *G01C 23/00* | (2006.01) |

(52) U.S. Cl.
CPC ............ *B64C 27/006* (2013.01); *B64C 27/06* (2013.01); *B64D 45/00* (2013.01); *G01C 23/005* (2013.01)

(58) Field of Classification Search
CPC ..................................................... B64C 27/006
See application file for complete search history.

(56) References Cited

U.S. PATENT DOCUMENTS

| 8,032,269 B2 | 10/2011 | Cherepinsky et al. |
| 8,798,814 B1 | 8/2014 | Spencer, V et al. |
| 9,802,713 B2 | 10/2017 | Sabnis et al. |
| 10,124,907 B1 | 11/2018 | Gavrilets et al. |

(Continued)

FOREIGN PATENT DOCUMENTS

EP        3869486 A1      8/2021

OTHER PUBLICATIONS

"Loss of Tail-Rotor Effectiveness," Wikipedia, downloaded from https://en.wikipedia.org/wiki/Loss_of_tail-rotor_effectiveness#:~:text= Loss of tail-rotor effectiveness (LTE) occurs when the, opportunity for it to occur on Mar. 21, 2024.

(Continued)

*Primary Examiner* — Davetta W Goins
*Assistant Examiner* — Pameshanand Mahase
(74) *Attorney, Agent, or Firm* — Ingrassia Fisher & Lorenz LLP

(57) ABSTRACT

A method for responding to loss of tail rotor effectiveness (LTE) on a rotorcraft having a tail rotor includes detecting an actual or predicted LTE, and determining a lateral LTE area relative to a position of the rotorcraft that is associated with the LTE. In response to the determination of the lateral LTE area, the method automatically displays an LTE alert on a horizontal display that indicates a location of the lateral LTE area relative to the position of the rotorcraft, and automatically indicates on the horizontal display a direction from the position of the rotorcraft that the rotorcraft should move to avoid the lateral LTE area.

20 Claims, 7 Drawing Sheets

(56) References Cited

U.S. PATENT DOCUMENTS

| | | | | |
|---|---|---|---|---|
| 10,705,110 | B2 | 7/2020 | Tang | |
| 11,801,936 | B2 | 10/2023 | Brand et al. | |
| 2007/0085707 | A1* | 4/2007 | Wyatt | G01C 23/005 |
| | | | | 340/979 |
| 2011/0202272 | A1* | 8/2011 | Feyereisen | G01C 23/00 |
| | | | | 701/532 |
| 2014/0074325 | A1* | 3/2014 | Nikolic | G01C 23/00 |
| | | | | 701/14 |
| 2014/0350753 | A1* | 11/2014 | Depape | B64D 45/00 |
| | | | | 701/3 |
| 2016/0019732 | A1* | 1/2016 | Fournier | G08G 5/21 |
| | | | | 701/34.2 |
| 2016/0054971 | A1* | 2/2016 | Yu | G06F 3/1423 |
| | | | | 345/2.1 |
| 2017/0057658 | A1* | 3/2017 | Sabnis | G05D 1/00 |
| 2017/0305571 | A1* | 10/2017 | Constans | B64D 31/04 |
| 2020/0116751 | A1* | 4/2020 | Tang | G05D 1/0825 |
| 2021/0383618 | A1 | 12/2021 | Cerqueira et al. | |
| 2022/0227488 | A1* | 7/2022 | Brand | B64C 27/82 |

OTHER PUBLICATIONS

Mornington Stanford Aviation, "Loss of Tail Rotor Effectiveness," downloaded from https://www.morningtonsanfordaviation.com/Loss-of-Tail-Rotor-Effectiveness.php on Mar. 21, 2024.

Huber, Mark, "NTSB Offers Guidance on Tail-Rotor Effectiveness," downloaded from https://www.ainonline.com/aviation-news/business-aviation/2017-03-14/ntsb-offers-guidance-tail-rotor-effectiveness on Mar. 21, 2024.

U.S. Department of Transportation, Federal Aviation Administration, Advisory Circular on Unanticipated Right Yaw in Helicopters, dated Dec. 26, 1995.

* cited by examiner

<u>600</u>

700

Receive Flight Plan 702

Predict a Loss of Tail Rotor Effectness (LTE) Downpath on the Flight Plan 704

Display Predicted Lateral LTE Area on Horizontal Display of Flight Plan 706

Generate Alternative Flight Path 708

Display the Alternative Flight Path 710

METHOD AND SYSTEM OF AUTOMATIC WARNINGS AND GUIDANCE FOR AVOIDING LOSS OF TAIL ROTOR EFFECTIVENESS ON A ROTORCRAFT

CROSS REFERENCE TO RELATED APPLICATION

This application claims priority to India Provisional Patent Application No. 202411040522, filed May 24, 2024, the entire content of which is incorporated by reference herein.

TECHNICAL FIELD

Implementations of the subject matter described herein relate generally to rotorcraft guidance and display systems and, more particularly, to automatically responding to a detected loss of tail rotor effectiveness.

BACKGROUND

Unanticipated yaw (referred to herein as loss of tail rotor effectiveness (LTE)) occurs when a vortex created by a main rotor of a rotorcraft is pushed into the tail rotor typically by wind. The resulting turbulence at the tail rotor causes a rotorcraft to spin around a vertical axis and requires a deft and vigilant response to the rotorcraft spin to safely recover. A rotorcraft is more susceptible to LTE when the pilot is operating at low airspeed, such as during takeoff or landing, and there is either a left crosswind (for rotorcraft with blades that rotate counterclockwise) or a tail wind.

During rotorcraft operations, pilots are required to make accurate and fast interpretations of the information presented by all components of the rotorcraft display system. Specifically, the rotorcraft pilot is heavily dependent upon information presented on the cockpit display, which typically comprises a primary flight display (PFD), a multi-function display (MFD), and a horizontal situation indicator (HSI). These displays visually convey information (e.g., flight path information, Navigational Aids (NAVAID), airspace information, terrain information, weather information, performance information, traffic information, and the like) obtained from various databases, sensors, and transponders. Current rotorcraft displays, however, often do not timely convey information relating to a potential LTE or onset of an LTE in a simple to understand manner that provides a pilot sufficient guidance as to the correct actions to employ to move away from the LTE zone or out of LTE conditions in a sufficient amount of time.

Hence, a need exists for a system and method that displays LTE location information and guidance to move away from the LTE location that easily conveys which flight control actions should be performed to avoid the LTE.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

By one implementation, a method for responding to loss of tail rotor effectiveness (LTE) on a rotorcraft having a tail rotor includes detecting an actual or predicted LTE, and determining a lateral LTE area relative to a position of the rotorcraft that is associated with the LTE. In response to the determination of the lateral LTE area, the method automatically displays an LTE alert on a horizontal display that indicates a location of the lateral LTE area relative to the position of the rotorcraft, and automatically indicates on the horizontal display a direction from the position of the rotorcraft that the rotorcraft should move to avoid the lateral LTE area.

By another implementation, a rotorcraft includes a body having a cockpit with a horizontal situation indicator display, and at least one main rotor and a tail rotor interconnected to the body, wherein the tail rotor rotates in a direction transverse to the rotation of the main rotor. Processor circuitry of the rotorcraft forms at least one processor communicatively coupled to the display and being arranged to operate by: detecting an actual or predicted loss of tail rotor effectiveness (LTE), determining a lateral LTE area in proximity to the rotorcraft that is associated with the LTE, and in response to the determination of the lateral LTE area, automatically displaying an LTE alert on a horizontal display that indicates a location of the lateral LTE area relative to a position of the rotorcraft, and automatically indicating on the horizontal display a direction from the position of the rotorcraft that the rotorcraft should move to avoid the lateral LTE area.

By yet another implementation, a system includes a horizontal display on a rotorcraft, and processor circuitry forming at least one processor communicatively coupled to the display and arranged to operate by: detecting an actual or predicted LTE, determining a lateral LTE area relative to a position of the rotorcraft that is associated with the LTE, and in response to the determination of the lateral LTE area, automatically displaying an LTE alert on a horizontal display that indicates a location of the lateral LTE area relative to the position of the rotorcraft, and automatically indicating on the horizontal display a direction from the position of the rotorcraft that the rotorcraft should move to avoid the lateral LTE area.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

All of the implementations described herein are example implementations provided to enable persons skilled in the art to make or use the disclosed methods, systems, and devices and not to limit the scope of the claims. Furthermore, no intention exists to be bound by any expressed or implied theory presented in the preceding technical field, background, brief summary, or the following detailed description.

The methods and systems disclosed herein alert a pilot to a potential LTE or an onset of an actual unanticipated LTE with simple intuitive symbology on a cockpit display. The desired method and system overlay or superimpose simple intuitive symbology on an existing horizontal display to alert a pilot to a lateral location of an LTE zone relative to a rotorcraft's current position. The display also may have symbology to indicate a direction the rotorcraft should be moved relative to the rotorcraft's current lateral position to avoid the LTE zone. Optionally, the present methods and systems automatically generate an exit flight plan that a pilot can use, whether manually or automatically by autopilot, to move away from or otherwise avoid the LTE zone and regain (or maintain) adequate tail rotor effectiveness. Thus, the present method and system provide LTE symbology that decreases pilot cognitive workload, and in turn, increases pilot situational awareness.

It will be appreciated that herein the term 'pilot' refers to any aircrew member of a rotorcraft or aircraft, and including a co-pilot, and may represent the entire aircrew unless the context indicates otherwise.

Figure 1:
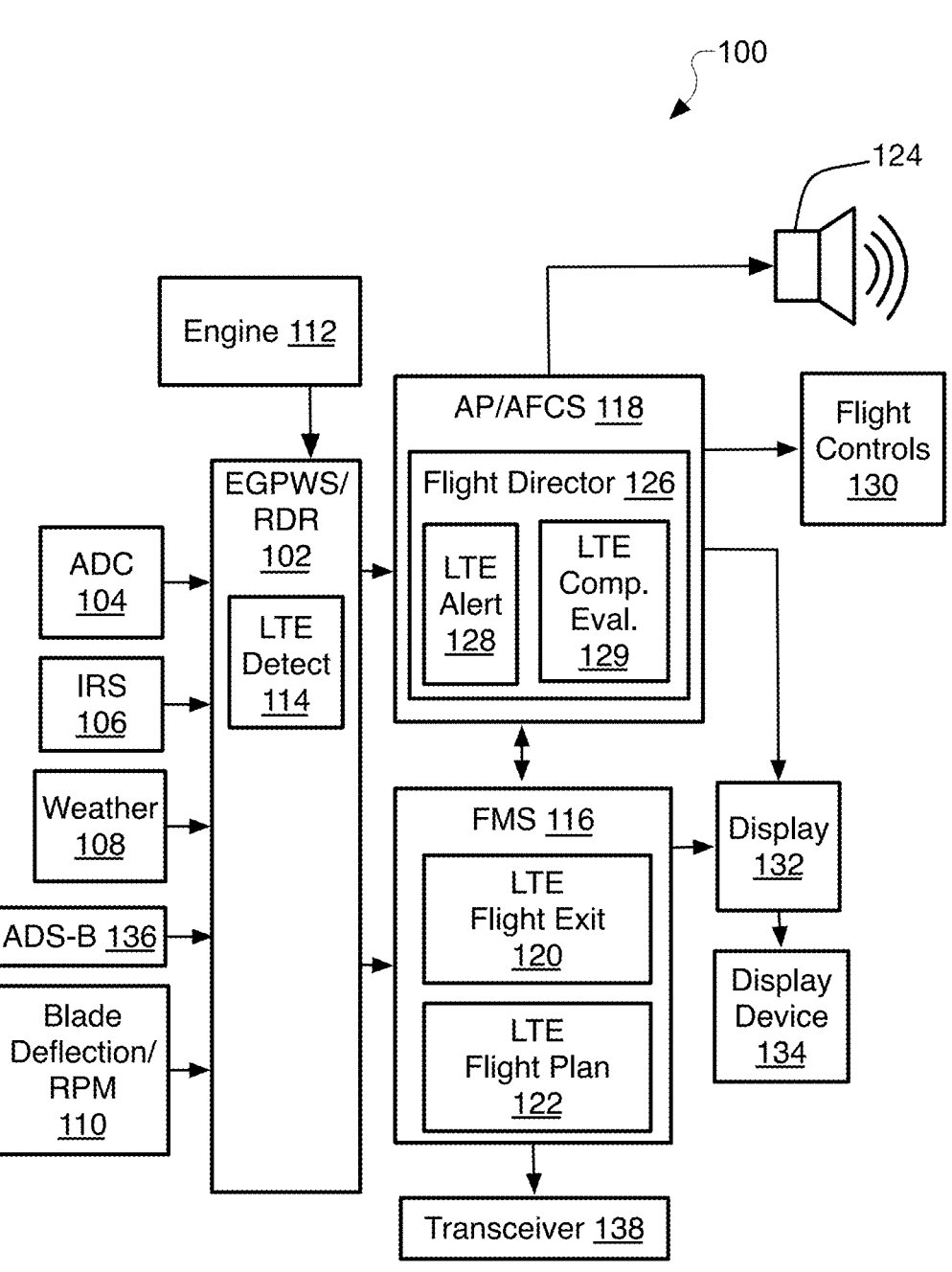
FIG. 1 is a schematic diagram of an example rotorcraft system according to at least one of the implementations herein.

Referring to FIG. 1, a rotorcraft system 100 provides automatic alerts and guidance in response to detection of an LTE according to the implementations herein. Specifically, the system 100 has an avionics computer such as an enhanced ground proximity warning system (EGPWS) and/ or weather radar (such as an RDR7000) computer or unit 102, as one example used herein. The system 100 also has an air data computer (ADC) 104, an inertial reference system 106, weather unit 108, blade deflection and RPM unit (or rotor measurement unit) 110, an automatic dependent surveillance broadcast (ADS-B) unit 136, a flight management system (FMS) 116 operated by a flight management computer (FMC), and an autopilot/automatic flight control system (AP/AFCS) 118 which are communicatively coupled to flight controls 130. A display unit 132 may have one or more display devices 134. An aural interface, audio system, or speaker 124 may be provided as well to provide audio announcements to the pilot. The engine 112 of the rotorcraft may be communicatively coupled to one or more units of system 100 for control of the engine 112 and/or to receive sensor data from the engine 112. The engine 112 is shown here communicatively coupled to the avionics computer or EGPWS/RDR unit 102. A transceiver 138 is also provided to receive and transmit data related to the LTE detection, alerts, and guidance as well as other systems related to rotorcraft control, and while shown here receiving data from the FMS 116 also may receive data from the AP/AFCS unit 118 for example and/or other units.

To perform the LTE detection, alert, and guidance operations described herein, the EGPWS/RDR unit 102 has an LTE detection unit 114, and the FMS 116 has an LTE flight exit unit 120 and an LTE flight plan unit 122. Also, the AP/AFCS unit 118 has a flight director 126 with an LTE alert unit 128 and an LTE compensation evaluation unit 129.

In will be appreciated that any of the units, systems, and devices of system 100 may be operated by processor circuitry and any combination of hardware, firmware, and software. Thus, system 100 may comprise, or be associated with, any suitable number of individual microprocessors, flight control computers, navigational equipment, memories, power supplies, storage devices, interface cards, input devices, and other standard components known in the art. In this respect, processors of system 100 may include or cooperate with any number of software models, software programs (e.g., rotorcraft display programs), or instructions designed to carry out the various methods, process tasks, calculations, and control/display functions described herein.

While in one example form, all the units, systems, and devices (referred to herein generally as units) of system 100 may be on-board, it will be understood that one or more of these units, or parts of one or more of these units, may be off-board and communicate wirelessly and remotely with the units that are onboard.

Also, while the label of a unit, module, and system on FIG. 1 indicates one or more functions of that unit, module, and system, it will be understood that those functions may be performed, at least partially, by other units or modules mentioned. Thus, for example, the detection of the LTE may be cooperatively performed by the avionics computer (or EGPWS/RDR) 102, AP/AFCS unit 118, and FMS 116, or any one or combination of these may perform the LTE detection.

Now in more detail, the ADC 104 has sensors to detect or compute air pressure, airspeed, air temperature, and altitude, while the IRS 106 has sensors and systems to determine attitude or orientation (roll, pitch, and yaw) and motion relative to inertial space (or a reference location or point) often determined by using accelerometers and gyroscopes. The weather unit 108 may have onboard and offboard weather sources including on-board sensors and wireless communication with remote weather servers. The ADS-B unit 136 transmits its position, velocity, and other navigational data and receives the same from nearby aircraft or rotorcraft for better air traffic situational awareness. The blade deflection and RPM unit 110 has tachometers to measure the actual RPMs of the main and tail rotor as well as feedback sensors (such as position sensors and/or hydraulic pressure sensors) to determine the actual deflection on the blades when the blades have adjustable deflection via rotor blade control systems, and the like. Other types of sensor and rotorcraft parameter measurement units, systems, and devices also may be used.

The EGPWS portion of the avionics computer or EGPWS/RDR unit 102 has access to terrain and obstacle databases to provide timely and urgent warnings about upcoming terrain and obstacles in time for a pilot to avoid such objects. This also may include air traffic and airspace restriction analysis.

The weather radar portion of the EGPWS/RDR unit 102 has onboard radar to detect and report (such as on a cockpit display) precipitation, clouds, thunderstorms, and turbulence that also can be used to confirm weather data from the weather unit 108. Wind data from the IRS 106, EGPWS/ RDR unit 102, and weather unit 108 may be used to determine wind velocity and wind direction near the rotorcraft and may be computed by the EGPWS/RDR unit 102 itself or by the AP/AFCS unit 118, by some examples. The EGPWS/RDR unit 102 also may have the LTE detection unit 114 to either predict an upcoming LTE area (or zone) on a downpath leg of a flight plan or to detect an actual current onset of an LTE area near the rotorcraft. This may be determined by several different LTE algorithms described below. It will be appreciated that the LTE detection unit 114 instead may be partially or wholly at the AP/AFCS unit 118, and particularly the flight director 126, and/or FMS 116. Otherwise, the LTE detection unit 114 may be, or have, sub-units or modules spread throughout these or other units of system 100, or may be a stand-alone unit or module.

The AP/AFCS unit 118 controls the autopilot and autonomous flight by controlling the flight controls 130. As part of the AP/AFCS unit 118, the flight director 126 has the LTE alert unit 128 to issue an initial aural alert to the pilot and then instructs the display unit 132 to initiate the display of an LTE zone warning indicating a location of the LTE zone on the display device 134. This may include displaying the LTE zone warning on a cockpit display such as a horizontal display or an HSI. The LTE compensation evaluation unit 129 monitors inertial and other data from the sensor units and determines if a pilot is adequately compensating or reacting to the detected LTE zone, or whether flight control settings are available for an autopilot to avoid the LTE zone. The flight director 126 still may also provide guidance to the pilot if the pilot is flying manually or when the autopilot is engaged to fly the rotorcraft in an autonomous flight.

Figure 4:
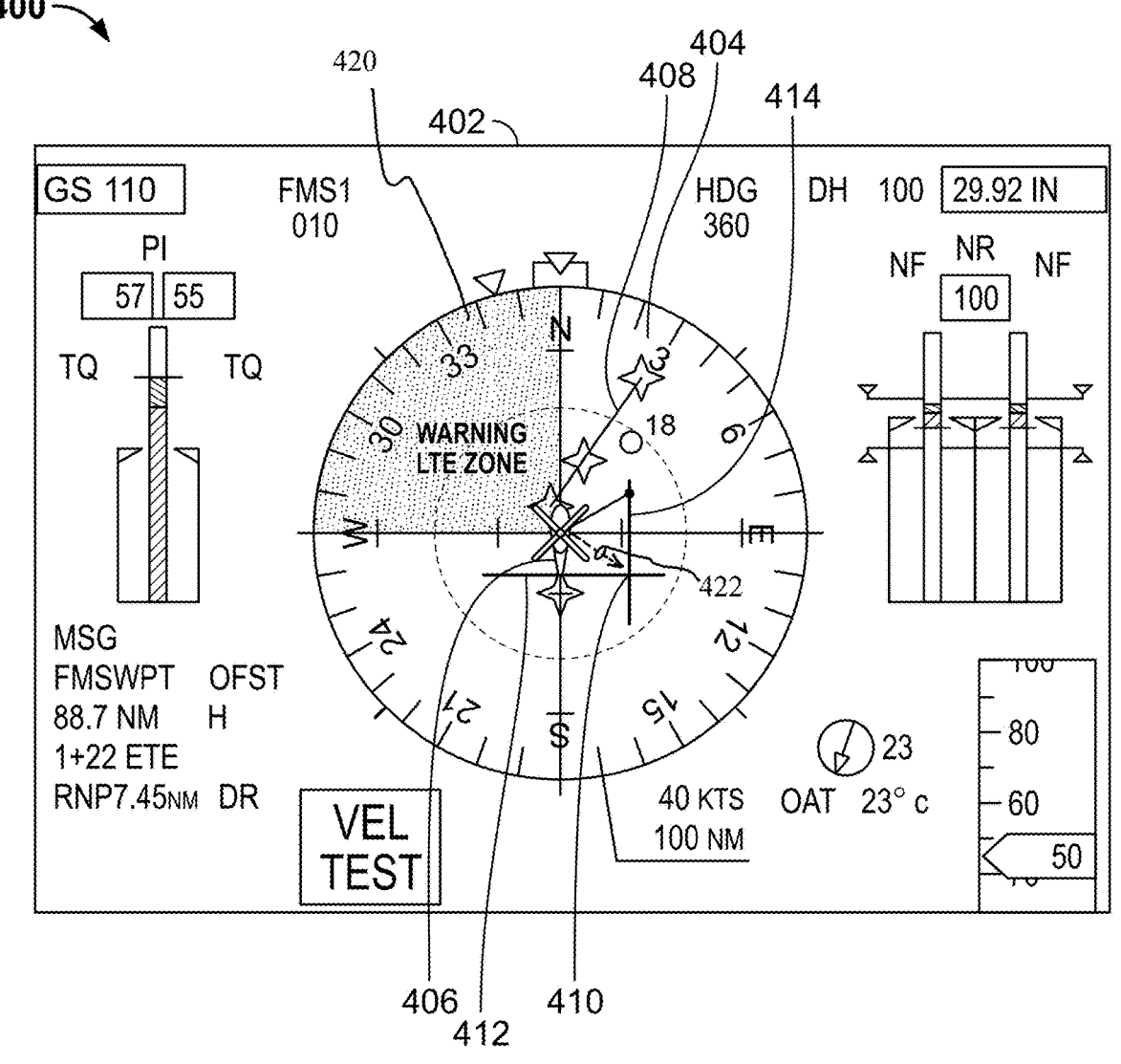
FIG. 4 is a schematic diagram of an example avionic display showing LTE information according to at least one of the implementations herein.

The FMS 116 analyzes navigation data, sets flight plans, and provides flight plan data and other navigation-related data for display on the avionic displays of display device 134, or further analysis or use by the other avionic units such as the AP/AFCS unit 118 and flight director 126 for example. Regarding LTE in the present example, the FMS 116 may provide the flight director 126 with location data for setting the location of an LTE zone on the horizontal display (FIG. 4 for example). An LTE flight exit unit 120 of the FMS 116 generates an LTE exit location for display in the cockpit or specifically, a horizontal display or HIS, and so that the rotorcraft can immediately move to the exit location to avoid the LTE zone. The exit location may be provided to the flight director 126 when the flight director 126 controls the reporting and display of the exit location. In addition, the FMS 116 may have an LTE flight plan unit 122 that generates an LTE exit or avoidance flight plan that can be displayed in the cockpit and that leads the rotorcraft away from, or avoids, the LTE zone. The LTE flight plan may be a bypass to avoid an LTE when the rotorcraft is already following a flight plan. The FMS 116 also may have other units that assist with detecting the LTE, such as units that provide wind models, predicted ground speed along a navigation route, predicted wind velocity and wind direction, and so forth. The FMS 116 also may provide the LTE avoidance flight plans ahead of time when LTEs can be predicted. More details are provided below.

The flight controls 130 include a blade deflection control, throttle, cyclic stick, collective lever, anti-torque (or tail rotor) pedals, rotor brake, trim controls, governor controls, and so forth. Such controls may be arranged for manual control and/or automatic control by an autopilot mode controlled by the AP/AFCS unit 118 or other unit.

During operation of the system for alerting a pilot to a potential or actual LTE, the ADC 104, IRS 106, weather unit 108, ADS-B 136, blade deflection/RPM unit 110, EGPWS/RDR unit 102, FMS 116, and AP/AFCS unit 118 continually generate navigational data pertaining to terrain, weather (including wind direction and wind velocity), rotorcraft altitude, rotorcraft status, and the like.

The display unit 132 receives data for display, formats the image data, and provides other image analysis and modifications as needed to provide image data to the display device 134. The display device 134 may be any image-generating device with a display screen suitable for use as a display on the rotorcraft or in the cockpit of the rotorcraft. The display 134 in this example is a primary flight display (PFD) at least with an HIS. The display device may have a multi-function display (MFD). The display device 134 may include various analog (e.g., cathode ray tube) and digital (e.g., liquid crystal, active matrix, plasma, etc.) display devices. In certain implementations, cockpit display 134 may assume the form of a Head-Down Display (HDD) or a Head-Up Display (HUD) included within a rotorcraft's Electronic Flight Instrument System (EFIS). Details of the operation of system 100 are provided with process 300 (FIG. 3) below.

Once the LTE detection unit 114 determines an actual or potential LTE exists, and by one example after the AP/AFCS unit 118 confirms the pilot is not adequately compensating to avoid the LTE, the FMS 116 and/or flight director 126, provides the location of an LTE zone, LTE exit location and/or LTE exit flight plan to the display unit 132 to generate display views (or images), such as HSI display views, to graphically or textually show the LTE data on the display device 134. This alerts the pilot to an LTE and guides the pilot out of, or away from, the LTE zone or area. By one example, the images may be 2D and/or 3D graphical displays on a PFD, HSI, and/or MFD of the display 134 that visually provide a composite of navigation information pertaining to the host rotorcraft, weather, navigational route information, altitude, terrain, and potential or actual LTE. A composite image on display 134 may be in a two-dimensional format (e.g., as a moving map display), a three-dimensional format (e.g., as a perspective display), or in a hybrid format (e.g., in a picture-in-picture or split screen arrangement). This may involve having visually distinguishable symbology related to the LTE superimposed or overlayed on symbols traditionally displayed on an existing cockpit display 134 to alert the pilot (although a separate LTE-specific display could be used instead when desired).

The visually distinguishable symbology prompts the pilot to correct motion of the rotorcraft by providing simple, intuitive visual notifications to the pilot that guides the pilot before or while moving the rotorcraft away from an LTE area. Various methods or techniques may be used to render visually distinguishable symbology, such as, but not limited to, depicting symbols using highlighting, color, flashing, shapes, objects, text, and/or dotted or broken lines, and as described below.

The aural warning device 124 may have one or more speakers in any suitable audio system to emit an aural warning when it is determined that a potential or actual LTE exists as described below.

Figure 2:
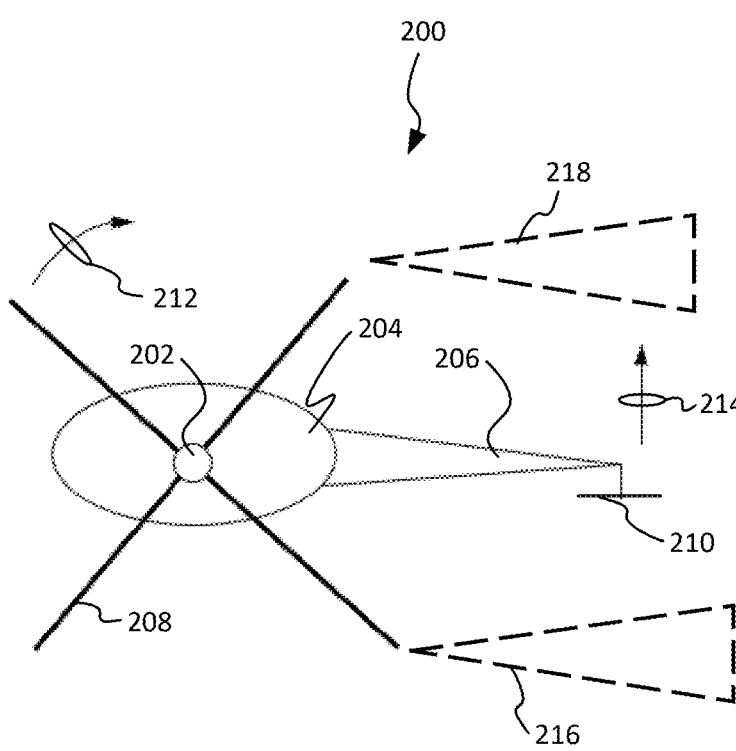
FIG. 2 is a schematic diagram of a top view of an example rotorcraft according to at least one of the implementations herein experiencing LTE.

Referring to FIG. 2, an example rotorcraft 200 has the system 100 and is shown in a normal liftoff or landing situation. Rotorcraft 200 has a main rotor 202 on a body 204 and that has main rotor blades 208 that form a main rotor blade span. A tail 206 of the rotorcraft 200 has a tail rotor 210. In this example, the main rotor 202 rotates in a clockwise direction 212 which imparts a clockwise torque on the body 204, and in turn on tail 206. The tail rotor 210 generates anti-torque thrust in a counter-clockwise direction 214 to counter act the clockwise torque from the main rotor 202, thereby enabling a pilot to control the yaw of the rotorcraft 200.

As shown in a normal or non-LTE condition, air flow and downwash vortexes 216 and 218 are created from the rotation of the main rotor 202. Without a strong crosswind, the vortexes 216 and 218 typically and generally extend straight back from the ends or span of the main rotor blades 208. In this situation, the vortexes 2216 and 218 do not significantly interfere with the anti-torque thrust from the tail rotor 210.

However, when a crosswind or a tail wind occurs when the rotorcraft 200 is moving at low forward airspeeds, typically less than 30 knots, one or both of the vortexes 216 and 218 are bent onto the tail rotor 210 and engulf the tail rotor 210 causing turbulence at the tail rotor 210 that interferes with or dissipates the anti-torque thrust from the tail rotor 210 by altering flow of air through the tail rotor 210 that alters the angle and/or speed at which the air passes through the rotating blades of the tail rotor disk. This causes loss of tail rotor effect (LTE). Without immediate counter-action, the rotorcraft can experience an uncontrolled spin, and in this example a clockwise spin.

Thus, one definition of LTE is an un-commanded, rapid yaw towards the advancing blade which does not subside of its own accord. LTE is an aerodynamic condition and is considered the result of a control margin deficiency in the tail rotor. This typically affects single-rotor helicopters that use a tail rotor. If tail rotor thrust is insufficient, the unanticipated and un-commanded yaw may occur due to the tail fin having low aerodynamic efficiency.

To adequately respond to the LTE and maintain rotational control of the rotorcraft, a pilot on the rotorcraft first needs to recognize the LTE is occurring. Often this may first happen when the pilot is adjusting the deflection of the main and tail rotor blades, and the pilot realizes no or little RPM and anti-torque thrust control exists at the tail rotor 210 in turbulent wind conditions. Even a high-power setting with a yaw pedal position which is close to its full travel may provide much less, if any, anti-torque thrust. The pilot then may attempt to apply large and rapid collective yaw inputs to avoid an uncontrolled spin of the rotorcraft 200. Thus, if LTE is not corrected, harm may occur to users and the rotorcraft.

The present methods and systems disclosed herein identify the onset of an LTE early in its formation referred to herein as the onset of the LTE) and increases the reaction time for pilots to recover control of the rotorcraft. Thus, the present system and methods permit a pilot to commence with positive recovery actions without delay as described below. Alternatively, when terrain, obstacles, and other predictable causes are known to result in an LTE, pilots can be warned of predicted LTEs way ahead of time, and exit LTE flight plans can be predetermined to avoid LTE zones.

Figure 3:
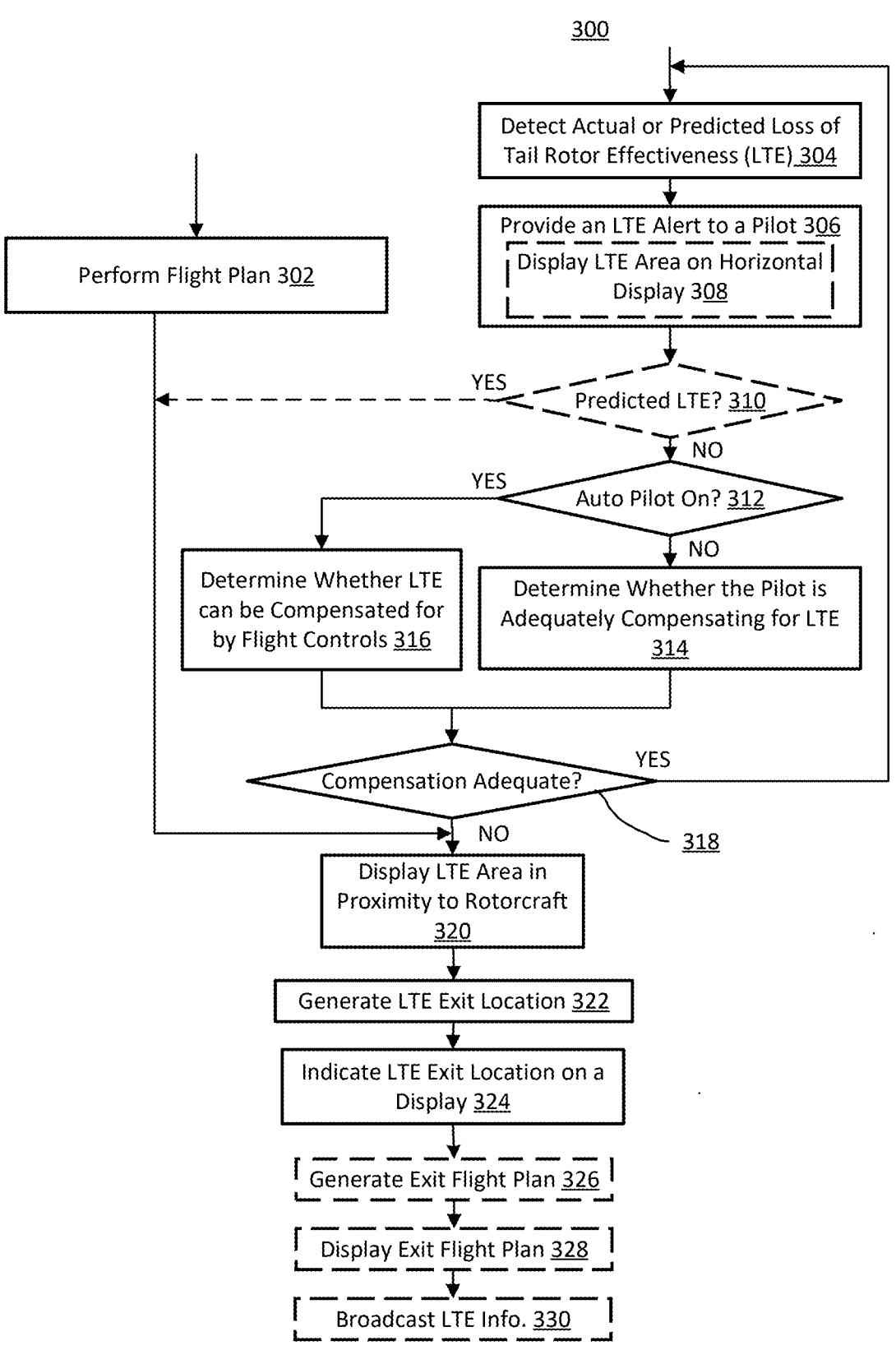
FIG. 3 is a flow chart of an example method of responding to an LTE according to at least one of the implementations herein.

Referring to FIG. 3, an example process 300 for responding to loss of tail rotor effectiveness (LTE) on a rotorcraft is described and according to at least one of the implementations herein. The process 300 may include operations 302 to 330 generally numbered evenly. Any of the rotorcrafts, systems, devices, and/or displays of FIGS. 1-2 and 4-5 may be referred to for process 300, and where relevant.

Process 300 may include "perform flight plan" 302. Thus, in the present example for process 300, a rotorcraft, such as rotorcraft 200 with system 100, may be flying a flight plan including planned waypoints, altitudes, airspeed, and so forth. The rotorcraft can be at the takeoff or landing for the flight plan as well. By other alternatives discussed herein, the rotorcraft may still be on the ground preparing for takeoff and may have an FMS that provides a flight plan to be followed. Both examples (in flight and on the ground) will be explained with process 300.

Process 300 may include "detect actual or predicted loss of tail rotor effectiveness (LTE)" 304. As to the actual LTE, the process 300 attempts to detect the early onset of the LTE. This involves collecting the sensor data, and by one form, by using the IRS and air-data computer (ADC) along with tachometers monitoring the main rotor and the tail rotor. The collected sensor data then can be used to compute and evaluate rotorcraft airspeed, wind velocity, wind direction, and rotorcraft height above ground to predict several scenarios for LTE zones. By one example, the IRS can compute wind direction based on the displacement of the expected rotorcraft position and orientation based on current aircraft thrust parameters versus the actual rotorcraft position and orientation. The IRS also provides wind velocity.

For yet another option, navigation data from other aircraft from the ADS-B unit may be used and from nearby flights. Abrupt changes in rotorcraft travel can be used to predict geographical regions where rotor blade vortexes could interfere with tail rotor effectiveness on the current rotorcraft receiving the ADS-B data.

Once the sensor data relevant to LTE is collected, process 300 can detect the onset of an LTE, and in turn an indication of a location of the LTE area or zone relative to a position of the rotorcraft. For this operation, the avionics computers, including the Enhanced Ground Proximity Warning Sys. (EGPWS) and/or the weather radar (RDR7000), can assess the output of the sensor units and compute measurements (such as wind speed and direction). The EGWPS/RDR unit can then make an initial conclusion that an onset of an LTE exists based on this data alone.

The flight director (FD) either uses the IRS data directly or data from the EGWPS/RDR unit to determine and confirm wind direction as well as angular and linear acceleration of the rotorcraft. The FD can use the wind and acceleration data in addition to the current rotor RPM/angle and tail rotor RPM/angle to compute the current effectiveness of the blades and the associated precession. Specifically, the flight director (FD) (also referred to as the guidance system) provides displacement of the rotorcraft as mentioned above and may conclude that the combination of the wind environment and a minimum displacement (or in other words, uncontrolled yaw) indicates the beginning or onset of an LTE zone has been reached by the rotorcraft. For one example, the FD can determine which side of the rotorcraft is experiencing the LTE depending on the direction of the wind (as well as the direction of torque and anti-torque thrust of the rotors). By detecting the wind direction, the flight director can estimate the main rotor vortex interaction and interference with the tail rotor.

By another alternative, the onset of an LTE may be detected by measuring the RPM of the main and tail rotors and noting the blade deflections. Various performance measurements then can be tabulated based on the RPMs, deflection, and/or additional measurements to generate a list of rotor conditions. The actual real-time rotor conditions then can be compared to historical data performance vectors listed as likely to be onset of an LTE. This detection process may use a predetermined look-up LTE reference table for the historical data.

By yet another alternative for detecting an LTE zone, forward airspeed can be compared to a threshold. When the forward airspeed is at or below a predetermined minimum forward speed threshold, such as 30 knots, and when the tail rotor is directing wind in the same direction as a cross wind, then the process 300 can conclude a detected LTE zone exists. Alternatively, an LTE zone may be considered to exist when the forward speed criterion is over the threshold and a cross wind is sensed at a certain direction such as about 280 degrees or a range from 210 to 330 degrees where 0/360 degrees is straight forward on the rotorcraft. Also, an LTE zone may be set when a tail wind is at certain directions. Many variations are contemplated.

By yet another option, onset of an LTE zone is detected by computing a wind separation factor at the tail rotor and induced by a tail rotor vortex ring state, low air density, main rotor wing vortex interacting with tail rotor thrust, and turbulent wind conditions.

Regarding LTE zone predictions rather than real-time or actual onset of LTE zone detection above, an LTE zone prediction on downpath legs of a predetermined flight plan for example can be determined by analyzing obstacle and terrain databases, such as those used to set altitude constraints. This involves evaluating known wind flow profiles at certain locations on the databases where terrain or structures, such as buildings (such as in urban areas), are known to generate LTEs. Thus, based on the terrain and obstacle configurations as well as automatic terminal information service (ATIS) information when relevant, the process 300 or system 100 can set an LTE prediction and mark regions on a forward or flight plan display where a potential LTE zone can occur on the flight plan. More details are provided below.

Process 300 may include "provide an LTE alert to pilot" 306, and in response to the EGWPS/RDR unit or FD unit determining an onset of an LTE zone exists. By one approach, and on detection of onset of the LTE, the crew first will be alerted through aural announcement via an audio speaker and may be performed by a crew alerting system (CAS). This may be a simple announcement of "Warning, LTE zone" or other language easily understood by the pilot to indicate an LTE zone.

By one approach while the rotorcraft is in flight and the aural warning has been issued, the detected LTE zone has not been displayed to the pilot yet, although such a warning LTE zone display can be provided anyway. Thus, as one option, operation 306 may include "display LTE area on horizontal display" 308, and this is described further below with operation 320. In the current approach, however, the LTE displays may not be provided until it can be determined that the pilot (or autopilot when used on a manned rotorcraft) is not or cannot compensate for the onset of the LTE and avoid the LTE zone. Particularly, the pilot may respond to the aural alert announcement and/or respond to the feeling and/or instrumentation that indicates the rotorcraft is starting an uncontrolled yaw. In this case, the pilot can attempt to compensate for the LTE by attempting to attain forward airspeed without increasing power (and if possible, even by reducing power), which often is successful in avoiding the LTE. By one form, before or during the compensation actions by a pilot, the FD can provide the pilot or the autopilot an amount of correction required to counter the loss of effectivity of the tail rotor and that is the displacement mentioned above, for example.

By an alternative approach when predicted LTEs are being detected for generating exit LTE flight plans rather than avoiding an actual onset of an LTE, an alert is provided upon analysis of a predetermined flight plan entered into the rotorcraft's navigation systems or FMS to predict an LTE zone downpath along the flight plan. This may be a light or symbol on a cockpit display or audio announcement warning of possible LTE ahead indicating the flight plan should be checked. This may occur while the rotorcraft is on the ground before a flight or while the rotorcraft is in the air already flying, and by one form, already flying on the flight plan. In these cases when an LTE zone is anticipated, such as by using a local obstacle and terrain database, the FMS will provide conflict warning and guidance to reroute (such as when the rotorcraft is flying through an urban area) and modify the predetermined flight plan. The FMS can provide a proposed LTE exit flight plan to avoid an LTE zone by assigning waypoints with latitude, longitude, altitude data, and so forth to safely exit or stay clear of the likely LTE zone.

Process 300 may include the inquiry "predicted LTE?" 310. Here, if the detected LTE is a predicted LTE, then process 300 skips to operation 320 since analysis of the pilot's compensation is not necessary. Otherwise, if the detected LTE is an actual or real-time onset of an LTE, process 300 continues with the inquiry "autopilot on?" 312. If the autopilot is not being used, process 300 may include "determine whether the pilot is adequately compensating for LTE" 314. This involves having the FD via AFCS monitor the inertial sensor data to determine if a pilot is adequately compensating or reacting to the possible or onset of the LTE by monitoring the yaw displacement for example, the FD is able to determine if the pilot's compensation is adequate.

Instead, when the autopilot is being used, process 300 may include "determine whether LTE can be compensated for by flight controls" 316. Here, the autopilot may determine flight control actions in response to the existing onset of the LTE. Those flight control settings may be implemented, and the FD may determine if this avoided the LTE, again by monitoring yaw displacement as one example. By other alternatives, rather than having the autopilot implement the LTE flight control response, the FD may determine that the rotorcraft must be moved away from an LTE zone and that the autopilot cannot avoid the LTE by simply employing flight control settings typically used in response to the LTE. This may be accomplished by, for example, comparing the expected thrust and reactions by the rotorcraft for the maximum settings of the flight controls and expected yaw displacement interpolated from a current LTE uncontrolled yaw displacement, for example.

Process 300 may include the inquiry "compensation adequate?" 318. If yes, then the process loops back to operation 304 to monitor the LTE conditions to determine if the detected LTE zone still exists and/or whether any other LTE onset is detected.

If the pilot or autopilot compensation is not adequate, process 300 next may include "display LTE area in proximity to rotorcraft" 320. Whether or not the system waits to determine if a pilot will compensate for the LTE and avoid an LTE zone, this operation includes providing visual guidance to the pilot to safely exit or avoid the LTE zone or condition upon detection of early onset of LTE. Such visual guidance first may include indicating an LTE zone or area warning on a display such as a horizontal display or HSI, and to be avoided.

In this case, the fight director may provide an indicator code in a list of available indicator codes that are provided to the display unit. The display unit may have predetermined images or image modifications to display depending on the indicator code, as one example. Thus, the code could indicate a sector of a compass on an HSI to highlight as explained below, although many variations exist as to the format of the code and the exact image or image modification that is to be displayed.

Referring to FIG. 4 for an example display, a visually distinguishable highlighted LTE area or zone is superimposed or overlaid on a display 400 such as an HSI 402 or other type of horizontal display. The HSI 402 may be part of a PFD, MFD, or other avionic display or may be separate from other displays in a cockpit of a rotorcraft, and with LTE alerts according to at least one of the implementations herein. The HSI 402 has a symbol for a rotorcraft 406 and is a compass header symbol on a circular portion 404 of the HSI 402 that is a compass. The rotorcraft symbol 406 shows the heading direction of the rotorcraft. In this illustrated example here, a detected LTE zone warning (or just LTE zone) 420 is a highlighted sector, and here a quadrant, of the circular portion 404. By one form, the highlighting may be red or any other desired effective color. In one alternative, only the outer boundary or arc of the sector, or any other part or pattern on the sector, is highlighted instead of an entire sector or quadrant as shown. In this example, the LTE zone warning 420 has a label "WARNING LTE ZONE" to indicate the pilot should avoid this area (front and left) of the rotorcraft and should move the rotorcraft away from this area. The label may have other text as desired, such as "AVOID", etc. It will be understood that the sector shown as the LTE zone can be larger or smaller than a quadrant. Otherwise, the label alone, where the pilot will understand it to refer to a quadrant or other sector of the compass, or the label with only highlighting of the periphery of the sector, may be used. By other alternatives, the LTE zone warning 420 may be displayed as any one or combination of colors, highlighting, flashing symbols on the display, shapes, objects, text, dotted, broken, or patterned lines, and so forth as long as the LTE zone warning 420 indicates that it is an LTE zone warning and the location of the LTE zone relative to a position of the rotorcraft, and particularly which side of the rotorcraft that the LTE zone exists. Thus, the LTE zone warning display conveys more than an indication that the rotorcraft is in an LTE zone. By one form, not only is it unnecessary to show that the rotorcraft is in an LTE zone, but the display does not provide that option. In this particular case, the LTE zone warning only provides a most likely side of the rotorcraft that has or is predicted to have the LTE zone, although by other options, both features can be available.

Process 300 may include "generate LTE exit location" 322. In this operation, the FD may be in an urgent or emergency mode and provides immediate guidance to guide the rotorcraft to fly to an exit location 410 on the HSI 402 that is safely away from the LTE zone 420. The FD identifies a quadrant away from the direction to which the helicopter is starting to orient due to wind cocking effect, for example, when the LTE onset is detected. The setting of the exit location also sets a direction 422 extending from a current position of the rotorcraft to the exit location. The FD, via the FMS, also factors local obstacles, terrain, air traffic, airspace restrictions, and so forth, while setting the guidance to the exit location to avoid additional LTE zones. Once the FD establishes the LTE zone sector or quadrant from which wind is pushing the main rotor vortex to interfere with the tail rotor, the FD computes the sector or quadrant to exit the LTE condition. Typically, the guidance direction will direct to the sector or quadrant away with a different wind direction compared to that creating the LTE conditions while considering the other terrain, obstacles, airspace, and traffic factors. The exit guidance or exit guidance cues such as the direction to the exit location will be generated by the system so that following the direction removes the aircraft from the external conditions resulting in LTE, which significantly improves safety and efficiency of the rotorcraft flight since it is very difficult for a pilot to determine such an exit direction.

Process 300 may include "indicate LTE exit location on a display" 324. Once the FD determines an LTE exit location and a guidance direction to the exit location, the FD will provide the exit guidance to initiate the display of the exit location. While the urgency of displaying an alert triggers the display of the exit location, this may occur whether or not it was determined that the pilot cannot compensate with flight controls and avoid the LTE.

Referring again to FIG. 4, an example exit location 410 is an intersection of crossing deviation lines including a latitude line 412 and a longitudinal line 414. When displayed on the HSI 402, a direction 422 to the exit location is from the current position of the rotorcraft 406 as shown by the arrow in dash line and to the line intersection (or cross pointer intersection) forming the exit location (or condition) 410. By other alternatives, the highlighting of a sector or quadrant that the pilot is to fly toward and into can establish the exit location rather than, or in addition to, the crossing deviation lines. In this regard, rather than highlighting an entire sector, just an arc through the sector or at the outer periphery of the sector may be highlighted. Such highlighting may be any color, but a different color when an LTE zone sector also has a highlighting color, such as red. In this case, the exit location color may be green. Otherwise, it will be appreciated that the indication of either the LTE zone, the exit location or both may be any desired highlighting, symbol, overlay, object, and so forth as mentioned above for the LTE zone warning 420 and that is a clear indication of the LTE zone or exit location to a pilot.

The result is an LTE warning and early detection monitoring system that identifies the conditions that cause LTE and generates cues provided to the pilot for caution and/or warning of an early onset of LTE. Guidance is then provided to resolve the LTE conditions.

The pilot then laterally and safely maneuvers the rotorcraft out of the LTE condition and toward and/or into (or near) the LTE exit location. Thus, the pilot controls the rotorcraft to follow the guidance in the exit direction from the current position the to the LTE exit location. By one example approach, once the LTE condition has been exited, the FD will provide guidance to hold pitch, roll and yaw (e.g., a position hold) if no other lateral or vertical mode is active or planned. If a flight plan is available, the FD and/or FMS will provide guidance to exit the LTE and transition to provide guidance to a next waypoint (FD will provide lateral and vertical guidance to the next waypoint once LTE condition is exited).

Thereafter, process 300 optionally may include "generate exit flight plan" 326, and this may be performed, when (1) the rotorcraft does not have an initial flight plan, (2) the initial flight plan cannot be used for various reasons, such as when flying back to the initial flight plan would be too inefficient, impractical, or blocked by vertical or lateral obstacle or terrain constraints, or (3) the LTE system on the rotorcraft detects another intervening LTE zone. In any of these, the system (or FD and/or FMS) may set the waypoint data (coordinates, altitude, and so forth) for the LTE exit flight plan.

If an initial flight plan is entered into an FMS where the FMS and/or FD detect a conflict region that has a probability for leading the rotorcraft into LTE conditions, the FMS and/or FD announces the conflict and proposes an alternative flight path for the pilot to review and accept. In this case, where the LTE zone is anticipated, such as by analyzing obstacle, terrain, air traffic, and/or airspace restrictions (such as with an urban area) as described elsewhere herein, the FMS will provide conflict or LTE warnings and guidance to reroute from the initial flight plan. Thus, the FMS will build waypoints as mentioned herein and for a new detour or separate LTE exit flight plan. to safely avoid LTE conditions.

Figure 5:
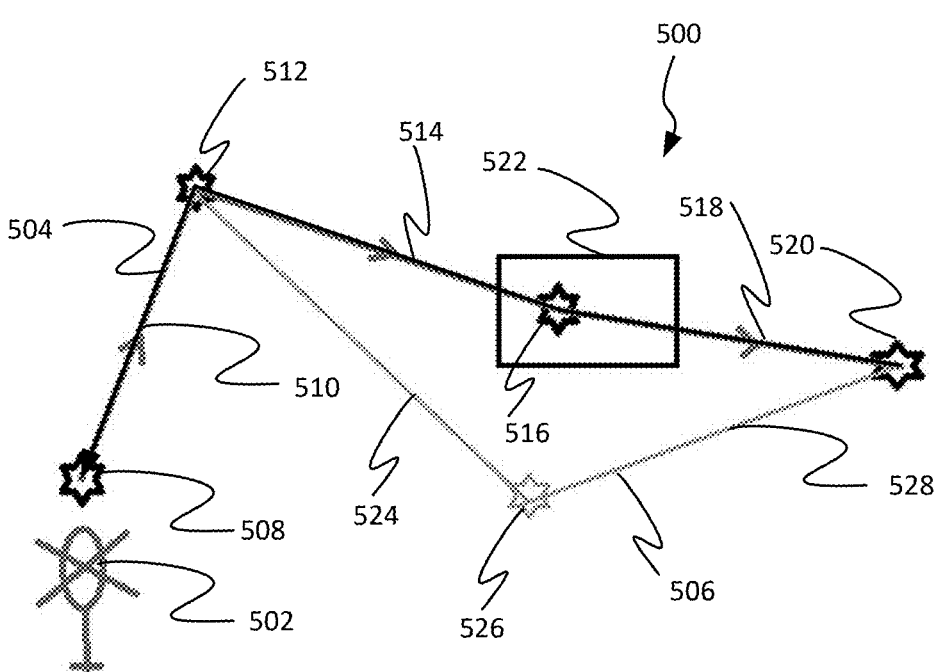
FIG. 5 is a schematic diagram of an example avionic display of an LTE exit flight plan avoiding an LTE zone according to at least one of the implementations herein.

Referring to FIG. 5 for example, an LTE exit flight plan 500 is shown and may be used in several examples. For example, the LTE exit flight plan 500 here for process 300 is used after an urgent or emergency mode when a rotorcraft encounters onset of an LTE and the exit location is used to safely guide the rotorcraft away from an LTE zone. Thereafter, the rotorcraft is guided onto and along a safe exit flight plan. By another alternative, process 700 below generates preplanned, LTE-safe flight plans, also shown by LTE exit flight plan 500 to avoid predicted LTEs.

In the example of process 300 here, process 300 may include "display exit flight plan" 328, where the exit flight plan 506 then is displayed on a horizontal display such as the HSI. Specifically, an initial flight plan 504 may be shown on a horizontal display, which may be flight plan or path 408 on HSI 402. Flight plan 504 has three legs 510, 514, and 518 among waypoints 508, 512, 516, and 520. In this example, the LTE detecting system of the rotorcraft detects an up-ahead or downpath LTE zone 522 with the waypoint 516 in the LTE zone 522. The LTE exit flight plan 506 adds a detour leg 524 from waypoint 512 to detour waypoint 526, and another leg 528 that leads from detour waypoint 526 and back to the initial flight plan 504 at waypoint 520, as one example. The flight plan 506 thereby avoids the LTE zone 522 altogether, and the pilot may now move the rotorcraft along the new detour flight plan 506.

Process 300 may include "broadcast LTE information" 330, and this refers to up-linking and broadcasting the location of an LTE zone and/or broadcasting the corrective measures, such as the guidance direction and LTE exit location away from the LTE zone. The broadcast may be to nearby rotorcraft or aircraft traffic. Other rotorcraft can then use this data to avoid LTEs.

Also, the broadcast may include usual ADS-B data. Thus, even though specific LTE-related data is not received by a rotorcraft, the data can be analyzed to determine if a rotorcraft transmitting data has experienced an abrupt change in course or flight path. In this case, it can be inferred that an LTE exists for abrupt changes in flight data indicating particular motion of the rotorcraft such as a rapid, unexplained significant yaw displacement and correction. The receiving rotorcraft can then avoid the region where the abrupt change occurred.

Figure 6:
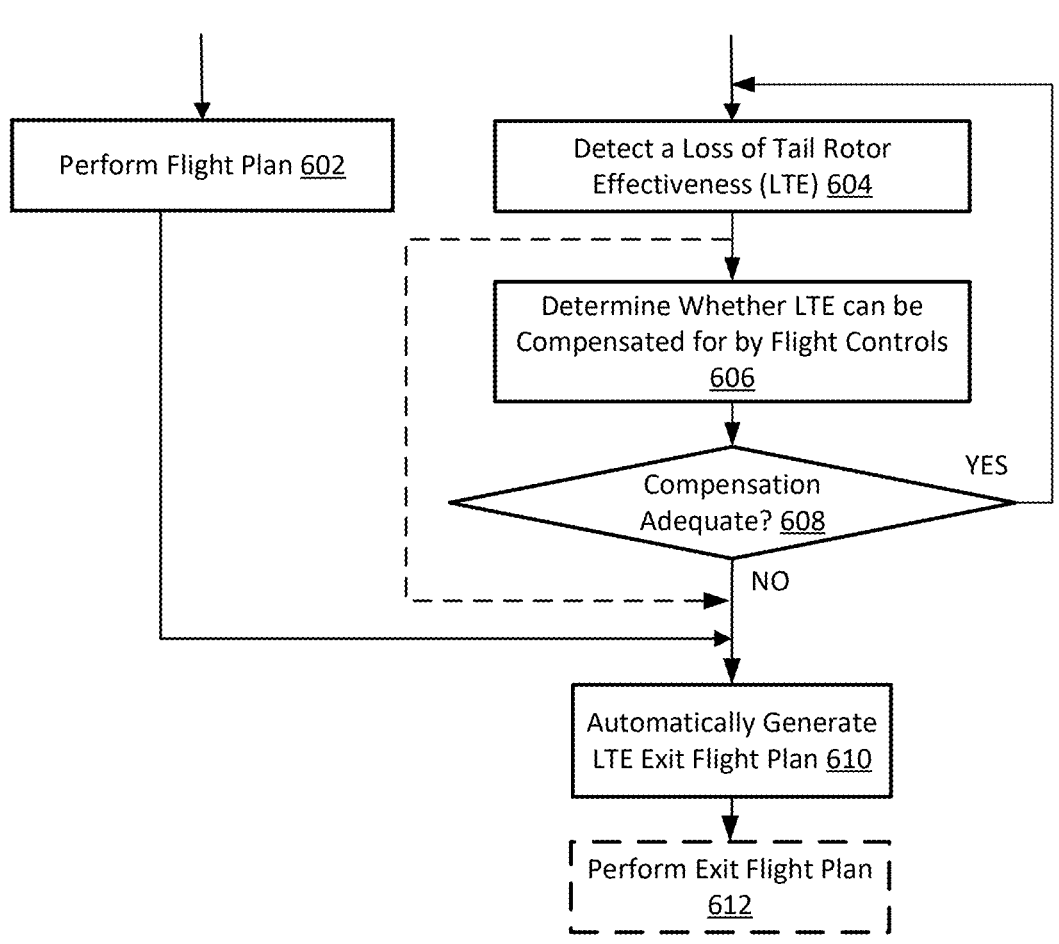
FIG. 6 is a flow chart of another example method of responding to an LTE according at least one of the implementations herein.

Referring to FIG. 6, a process 600 is provided for generating an LTE exit flight plan for an unmanned rotorcraft that avoids a detected LTE zone, according to at least one of the implementations herein. Process 600 may include operations 602 to 612 numbered evenly. Any of the rotorcrafts, systems, devices, and/or displays of FIGS. 1-2 and 4-5 may be referred to for process 600, and where relevant.

Process 600 is similar to that of process 300 except here no display of warnings, exit location, and LTE exit flight plan is used. The unmanned rotorcraft may be performing 602 a flight plan, and when the system detects 604 LTE as described above for process 300, the autonomous autopilot will first attempt to compensate 606 for the LTE to gain back tail rotor effect. If the compensation is not adequate when checked 608, the system will automatically generate 610 an LTE exit flight plan (which may include first setting and flying to an exit location) as also described above with process 300. Thereafter, the system may perform 612 or execute the exit flight plan.

Figure 7:
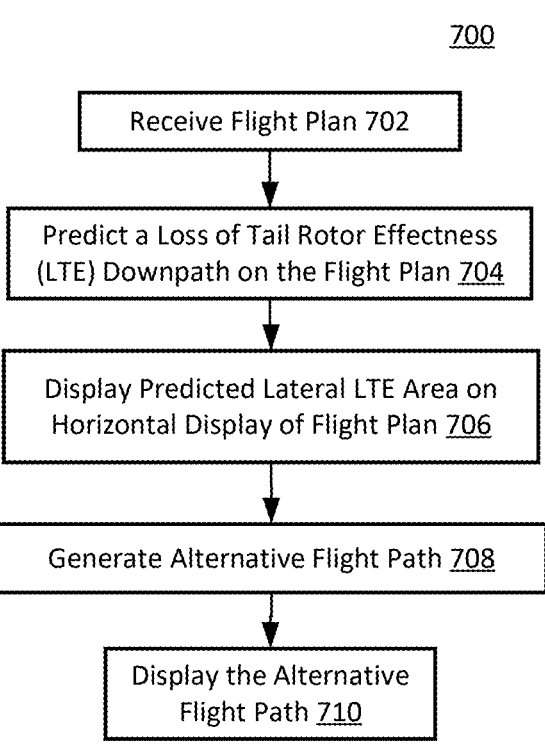
FIG. 7 is a flow chart of yet another example method of responding to an LTE according to at least one of the implementations herein.

Referring to FIG. 7, a process 700 is provided for predicting an LTE along a flight plan and providing an alternative flight plan that avoids the LTE area, according to at least one of the implementations herein. Process 700 may include operations 702 to 704 numbered evenly. Any of the rotorcrafts, systems, devices, and/or displays of FIGS. 1-2 and 4-5 may be referred to for process 700, and where relevant.

Process 700 may include receiving 702 a flight plan for a rotorcraft, and specifically received from an air traffic control (ATC) or pilot, and received by an FMS of the rotorcraft, although other variations are contemplated and included such as an FMS generating the flight plan and a system 100 receiving the flight plan for LTE analysis. This may occur whether the rotorcraft is still on the ground or is already flying on a flight plan. It will be noted that while the LTE exit flight plan 500 of FIG. 5 is first described as a post-emergency mode flight plan alteration, the same flight plan display can be used here for a predicted LTE, non-urgent mode as well. This flight plan discussed here may be a predetermined initial flight plan, such as flight plan or path 504 (FIG. 5) and that has an LTE zone 522 along the path 504 and that is to be avoided. The flight plan 504 may have waypoints with longitudinal and latitude coordinates as well as altitudes, and so forth as shown.

Process 700 then may include predicting 704 an LTE downpath on the flight plan. For this operation, the FMS and/or FD analyzes the waypoints of the flight plan, and using terrain and obstacle databases with or without predetermined or historical air flow profiles, identifies flight profiles with regions where an LTE can be encountered or identifies contours, terrain, or man-made objects (buildings) where a high probability of causing an LTE exists.

Once an LTE region is identified, a warning of an LTE zone or region may be displayed 706 that is a predicted lateral area of an LTE zone on a horizontal display of the flight plan as on FIG. 5, and to alert the pilot of the LTE risk.

Meanwhile or thereafter, the process 700 may generate 708 an alternative flight plan 506 that avoids obstacles, terrain, and so forth that cause LTE regions, and one or more alternative waypoints 526 may be added to the flight plan to avoid the LTE region 522. As already described above, the alternative flight plan that avoids the LTE region is then displayed 710 on a horizontal display visible to the pilot also.

It will be appreciated that the various illustrative logical blocks, modules, units, circuits, and algorithms described in connection with the implementations disclosed herein may be implemented as hardware, firmware, software, or any combination of these. Some of the implementations are described above in terms of functional and/or logical block components (or modules or units) and various processing operations. However, it should be appreciated that such block components (or modules or units) may be realized by any number of hardware, software, and/or firmware components configured to perform the specified functions. To clearly illustrate this interchangeability of hardware and software, various illustrative components, blocks, units, modules, circuits, and operations have been described above generally in terms of their functionality. Whether such functionality is implemented as hardware, firmware, software, or a combination of these depends upon the application and development constraints imposed on the overall system. Skilled artisans may implement the described functionality in varying ways for each application, but such implementation decisions should not be interpreted as causing a departure from the scope of the present implementations. For example, an implementation of a system or a component may employ various integrated circuit components, e.g., memory elements, digital signal processing elements, logic elements, look-up tables, or the like, which may conduct a variety of functions under the control of one or more microprocessors or other control devices. In addition, those skilled in the art will appreciate that implementations described herein are merely examples.

The various illustrative logical blocks, modules, units, and circuits described in connection with the implementations disclosed herein, such as the units and systems of system 100 described above (FIG. 1), may be implemented by or operated by processor circuitry forming a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with one or more DSP cores, a system on a chip (SoC), or any other such configuration.

The operations of a method or algorithm described in connection with the implementations disclosed herein may be embodied directly in hardware, firmware, in a software module executed by a processor, or in any combination of these. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical units' components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an implementation of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units, also referred to as modules, described in this specification have an implementation independence. For example, functionality referred to herein as a module or unit may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process operations must be performed in a temporal or logical order according to such sequence unless it is specifically defined by the language of the claim. The process operations may be interchanged in any order without departing from the scope of the disclosure as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "substantially" denotes within 5% to account for manufacturing tolerances. Also, as used herein, the term "about" denotes within 5% to account for manufacturing tolerances.

While at least one example implementation has been presented in the foregoing detailed description of the implementations, it should be appreciated that a vast number of variations exist. It should also be appreciated that the example implementation or example implementations are only examples, and are not intended to limit the scope, applicability, or configuration of the disclosures in any way. Rather, the foregoing detailed description will provide those skilled in the art with a convenient road map for implementing an example implementation. It being understood that various changes may be made in the function and arrangement of elements described in an example without departing from the scope of the implementations as set forth in the appended claims.

What is claimed is:

1. A method for responding to loss of tail rotor effectiveness (LTE) on a rotorcraft having a tail rotor, the method comprising:

detecting an actual or predicted LTE;

determining a lateral LTE area in the air and offset to a lateral side of a position of the rotorcraft that indicates which side of the rotorcraft will maintain the LTE; and in response to the determination of the lateral LTE area, automatically displaying an LTE alert on a horizontal display that indicates an offset side location of the lateral LTE area relative to the position of the rotorcraft, and automatically displaying on the horizontal display, a graphical indicator of a direction from the position of the rotorcraft that the rotorcraft should move to avoid the lateral LTE area and that is distinct from display of the LTE alert.

2. The method of claim 1, wherein the horizontal display has a circular portion with a symbol of the rotorcraft at a center of the circular portion, and the LTE alert is a highlighting or a symbol on a sector of the circular portion.

3. The method of claim 2, wherein the sector is a quadrant of the circular portion.

4. The method of claim 2, wherein the horizontal display is a horizontal situation indicator (HSI), and the circular portion is an image of a compass.

5. The method of claim 1, wherein the direction is indicated by an intersection of lateral and longitudinal deviation lines on the horizontal display, wherein a position of the intersection relative to the symbol of the rotorcraft indicates which direction the rotorcraft should move from its current position to avoid the lateral LTE area.

6. The method of claim 1, comprising determining whether a pilot is implementing flight controls to adequately compensate for LTE effects on the aircraft; and displaying the location of the lateral LTE area when it is determined that the flight controls are not adequate.

7. The method of claim 1, comprising displaying an exit LTE flight plan on the horizontal display that avoids the lateral LTE area.

8. The method of claim 7, comprising automatically controlling the rotorcraft to move along the heading of the exit LTE flight plan without a pilot steering the rotorcraft.

9. The method of claim 1, comprising broadcasting data indicating a location of the lateral LTE area to other aircraft.

10. The method of claim 1, wherein the LTE is a predicted LTE downpath from a position of the rotorcraft, and wherein the method comprises displaying an initial flight path on the horizontal display and with an indication of the lateral LTE area on the horizontal display and an automatically generated alternative flight path that avoids the lateral LTE area.

11. A rotorcraft, comprising:

a body having a cockpit with a horizontal situation indicator display;

at least one main rotor and a tail rotor interconnected to the body, wherein the tail rotor rotates in a direction transverse to the rotation of the main rotor; and processor circuitry forming at least one processor communicatively coupled to the display and being arranged to operate by:

detecting an actual or predicted loss of tail rotor effectiveness (LTE), determining a lateral LTE area in the air and offset to a lateral side of the rotorcraft that indicates which side of the rotorcraft will maintain the LTE, and in response to the determination of the lateral LTE area, automatically displaying an LTE alert on a horizontal display that indicates an offset side location of the lateral LTE area relative to a position of the rotorcraft, and automatically displaying on the horizontal display, a graphical indicator of a direction from the position of the rotorcraft that the rotorcraft should move to avoid the lateral LTE area and that is distinct from the display of the LTE alert.

12. The rotorcraft of claim 11, wherein the horizontal display has a circular portion with a symbol of the rotorcraft at a center of the circular portion, and the LTE alert is a highlighting along an outer edge of a sector of the circular portion.

13. The rotorcraft of claim 11, wherein the direction is indicated by a sector of a circular portion of the display that is highlighted in a different color than a color of highlighting of the LTE alert.

14. The rotorcraft of claim 11, wherein the at least one processor comprises multiple processors comprising at least one processor disposed remote from the rotorcraft to perform at least one part of the detecting, determining, displaying, or indicating.

15. The rotorcraft of claim 11, comprising determining whether a pilot is implementing flight controls to adequately compensate for LTE effects on the aircraft; and displaying the location of the lateral LTE area and the direction when it is determined that the flight controls are not adequate.

16. A system, comprising:

a horizontal display on a rotorcraft; and processor circuitry forming at least one processor communicatively coupled to the display and arranged to operate by:

detecting an actual or predicted LTE, determining a lateral LTE area in the air and offset to a lateral side of a position of the rotorcraft that indicates which side of the rotorcraft will maintain the LTE; and in response to the determination of the lateral LTE area, automatically displaying an LTE alert on a horizontal display that indicates an offset side location of the lateral LTE area relative to the position of the rotorcraft, and automatically displaying on the horizontal display, a graphical indicator of a direction from the position of the rotorcraft that the rotorcraft should move to avoid the lateral LTE area and that is distinct from the display of the LTE alert.

17. The system of claim 16, wherein the at least one processor is arranged to operate by automatically controlling the rotorcraft to move along the heading of the direction to an exit location without a pilot steering the rotorcraft.

18. The system of claim 16, wherein the at least one processor is arranged to operate by displaying an exit LTE flight plan on the horizontal display that avoids the lateral LTE area.

19. The system of claim 16, wherein the at least one processor is arranged to operate by broadcasting data indicating the direction away from the lateral LTE area to other aircraft.

20. The system of claim 16, wherein the at least one processor is arranged to operate by receiving data of the movement of other rotorcraft, and predicting a lateral LTE area depending on the data.

* * * * *